June 15, 1926.

J. C. HAGGART, JR 1,588,723

BRAKE FOR MOTOR VEHICLES

Filed Oct. 26, 1923  2 Sheets-Sheet 1

Inventor

John C. Haggart Jr.

By

Attorneys

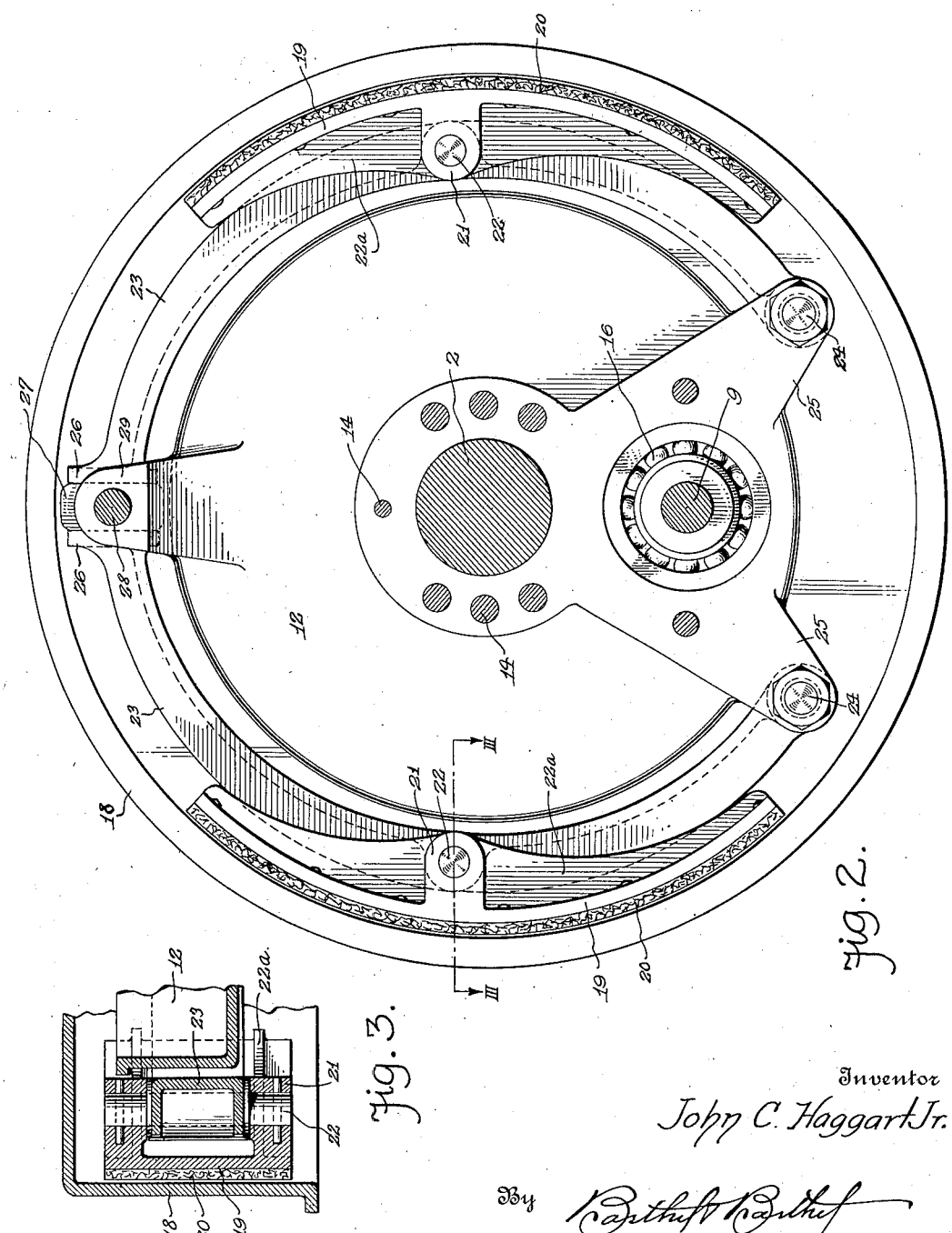

Patented June 15, 1926.

1,588,723

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

BRAKE FOR MOTOR VEHICLES.

Application filed October 26, 1923. Serial No. 670,827.

This invention relates to a brake for motor vehicles and has special reference to that class of brake mechanism associated with the rear axle assembly of a truck or any heavy duty motor vehicle, the brake mechanism including brake drums on the rear wheels of the vehicle with brake shoes in the drums adapted to engage the inner walls thereof and retard or eventually stop rotation of the wheels, such interior arrangement of the brake shoes being in contradistinction to an exterior arrangement of such shoes, for instance as disclosed in my companion application filed under even date.

The primary object of my invention is to locate brake shoes within a brake drum about an axle so that the shoes are diametrically opposed in the plane of the axle, instead of being offset relative to the plane of the axle and by placing the shoes in opposed relation and applying a braking action thereto the forces set up by the brake shoes are balanced so that there is no twisting action or torque of the brake drum relative to the axle and the wheel rotatable on the axle and to which the brake drum is attached.

Another object of my invention is to provide a brake mechanism wherein fulcrumed self adjusting brake shoes are movable relative to the inner wall of the brake drum, and an adjusting mechanism supports the brake shoes so as to bodily shift the same and yet permit of self adjustment of the shoes during the application of the brakes.

A further object of my invention is to provide a brake mechanism that has been especially designed as a rear axle brake for a truck, but on account of the compact arrangement of the brake mechanism it is applicable to any axle and the wheels thereof. For instance it may be used in connection with a four-wheel drive as well as a two-wheel drive vehicle and on account of the positive and reliable braking action of the mechanism it may be depended upon for controlling heavy loads.

With the above and other objects in view my invention resides in the novel construction to be hereinafter disclosed and reference will now be had to the drawings, wherein:—

Fig. 2 is a cross sectional view of the same showing the brake shoes in a brake drum, and Fig. 3 is a horizontal sectional view taken on the line III—III of Fig. 2.

Figure 1:
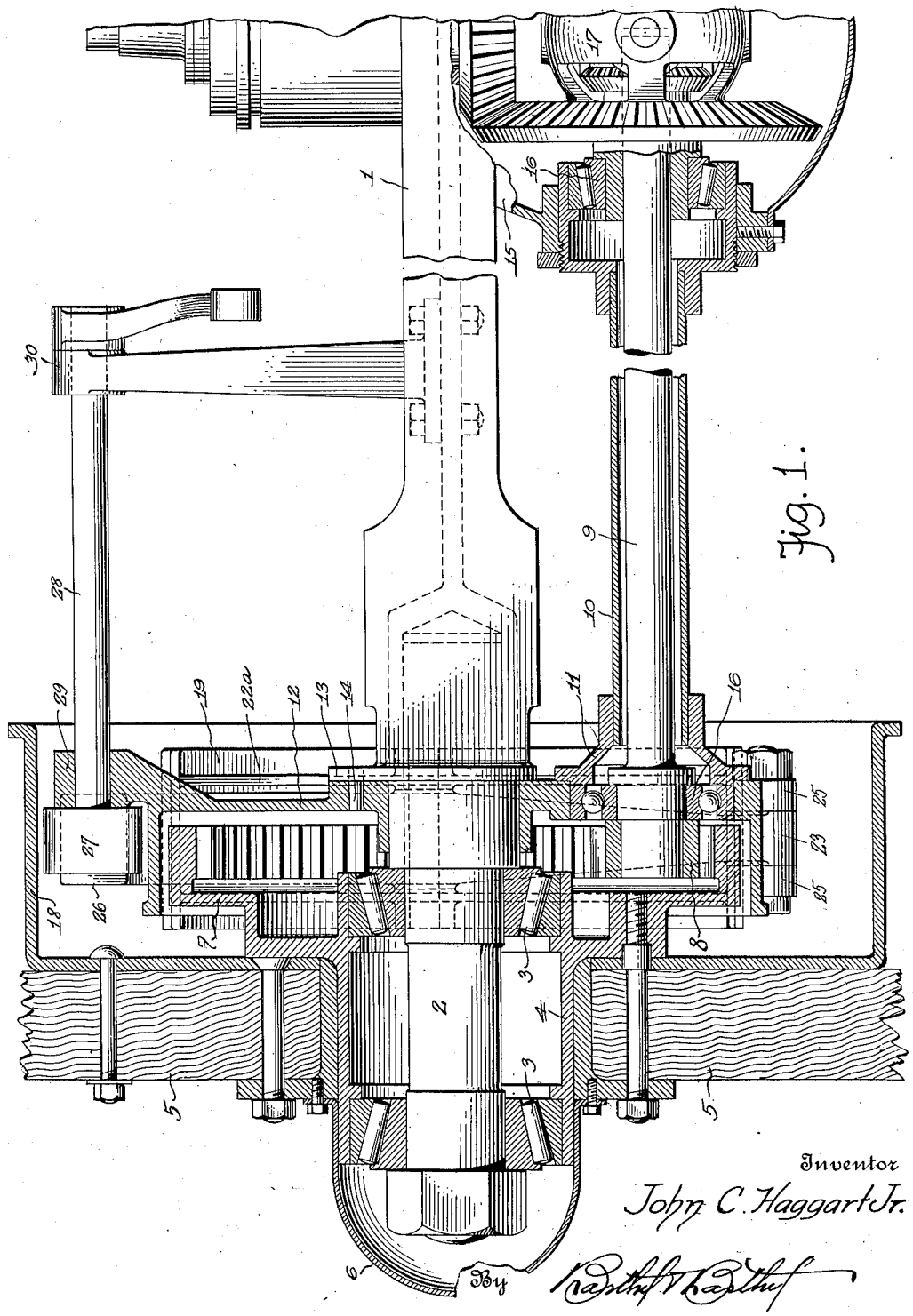
Figure 1 is a longitudinal sectional view of a portion of an axle assembly provided with a brake mechanism in accordance with my invention.

In the drawing, the reference numeral 1 denotes a portion or a rear axle having a spindle 2 provided with anti-frictional roller bearings 3 for the hub 4 of a wheel 5. At the outer side of the wheel 5 is a hub cap 6 and at the inner end of the hub 4 is an internal gear or rack 7. Meshing with the internal gear or rack 7 is a pinion 8 on a drive shaft 9 extending through a tube 10 having its outer end supported in a cap 11 carried by a gear housing 12 mounted on the axle 1 and fixed to a flange 13 thereof by dowel pins 14 and other fastening means. The inner end of the tube 10 is supported from a differential housing 15 forming part of the rear axle assembly, and the drive shaft 9 is journaled in anti-frictional bearings 16 and driven by a conventional form of differential mechanism within the housing 15.

Suitably attached to the face of the wheel 5 is a brake drum 18 and arranged within said brake drum and adapted to engage the inner wall thereof are opposed fulcrumed brake shoes 19 having liners 20, sets of apertured lugs 21, and reinforcing webs or ribs 22ª.

Pinned or otherwise fixed in the apertured lugs 21 are fulcrum pins 22 journaled in arcuated shoe supports 23, said shoe supports being channel shaped in cross section with the lower ends thereof pivotally connected, as at 24, to diverging apertured ears or extensions 25 of the gear housing 12.

The upper ends of the shoe supports are in proximity to each other and terminate in cam heads 26 normally engaged by a cam 27 mounted on the end of the rock shaft 28, journaled in a bearing 29, carried by the gear housing 12 and a bracket 30 carried by the axle 1. Any suitable means may be employed for rocking the cam shaft 28 to cause the cam 27 to distend the shoe supports 23 and place the shoes 19 in engagement with the inner wall of the brake drum 18.

Considering Fig. 2 the pivoted ends of the arcuated shoe supports are below the plane of the axle so that the fulcrum pins 22 may be in opposed relation and in the plane of the axle, instead of above or below such plane. It is therefore obvious that when the arcuated shoe supports are actuated that the brake shoes are carried in opposite directions away from the axle, but in the same plane of the axle and since the brake shoes are fulcrumed each shoe may be self adjusting and equalize its pressure against the inner wall of the brake drum. With the pressure equally distributed and applied at diametrically opposed points relative to the axle there is a positive braking action set up that has no tendency to twist and displace parts of the brake mechanism relative to the rear axle. This is in contradistinction to those arrangements wherein the brake shoes are other than diametrically opposed and out of the plane of the axle, for in such arrangements stresses and strains are set up which subject the brake mechanism to considerable wear and tear and it is practically impossible to obtain a positive braking action.

I have herein referred to the arcuated shoe supports as having upper and lower ends with relation to the axle, whereas the brake mechanism may be disposed relative to an axle, as shown in Fig. 1, wherein the upper ends of the supports are forward of the axle and the pivoted ends of the supports in the rear of the axle; it all depending on the location of the differential mechanism or the position of the drive shaft 9 relative to the axle 1.

It is thought that the operation and utility of the brake mechanism will be apparent without further description, and while in the drawings there is illustrated a preferred embodiment of my invention, it is to be understood that the structural elements are susceptible to such changes in size, shape and manner of assembling, as fall within the scope of the appended claim.

What I claim is:—

In a rear axle assembly, an axle, a differential mechanism at one side of said axle, driving means at said axle for said differential mechanism, a wheel rotatably supported by said axle, a brake drum attached to said wheel, an internal gear in said drum and rotatable therewith, a gear housing attached to said axle, an axle shaft disposed parallel to said axle at one side thereof and journaled in said gear housing and adapted to drive said internal gear, shoe supports pivotally connected to said gear housing exteriorly thereof and having free ends adapted to be separated, drum engaging brake shoes fulcrumed on said shoe supports with the fulcrums at opposite sides of a vertical plane through said axle, and means supported from said gear housing at the opposite side of said axle from said axle shaft for separating the free ends of said shoe supports.

In testimony whereof I affix my signature.

JOHN C. HAGGART, Jr.